United States Patent [19]

Shingo et al.

[11] Patent Number: 4,549,041
[45] Date of Patent: Oct. 22, 1985

[54] FLAME-RETARDANT CROSS-LINKED COMPOSITION AND FLAME-RETARDANT CABLE USING SAME

[75] Inventors: Yoshioki Shingo, Numazu; Takao Matsuda, Mishima; Akira Yoshino, Shizuoka; Hideo Sunazuka, Kamagaya; Masatake Hasegawa, Tokyo; Hirotada Kobayashi, Sakura, all of Japan

[73] Assignee: Fujikura Ltd., Tokyo, Japan

[21] Appl. No.: 614,157

[22] Filed: May 25, 1984

[30] Foreign Application Priority Data

Nov. 7, 1983 [JP] Japan ............................. 58-207393
Mar. 7, 1984 [JP] Japan ............................. 59-043138

[51] Int. Cl.$^4$ .................... H01B 7/02; H01B 3/30; C09K 3/28
[52] U.S. Cl. ...................... 174/113 R; 174/116; 174/121 A; 252/609; 428/391
[58] Field of Search .................. 174/113 R, 121 A; 428/384, 391; 252/601, 609

[56] References Cited

U.S. PATENT DOCUMENTS

| | | | |
|---|---|---|---|
| 3,265,808 | 8/1966 | Binch | 174/121 A |
| 3,576,388 | 4/1971 | Bruns | 174/113 R X |
| 3,808,127 | 4/1974 | Sander | 252/609 |
| 3,862,353 | 1/1975 | Morton | 174/121 A X |
| 3,900,701 | 8/1975 | Bayles et al. | 174/121 A X |
| 4,001,128 | 1/1977 | Penneck | 174/110 SR X |
| 4,280,225 | 7/1981 | Willis | 174/121 A X |
| 4,327,001 | 4/1982 | West | 524/437 X |
| 4,353,817 | 10/1982 | Nakae et al. | 524/400 X |
| 4,430,384 | 2/1984 | George | 174/121 A X |
| 4,430,470 | 2/1984 | Taniguchi et al. | 428/391 X |
| 4,444,948 | 4/1984 | Hochstrasser et al. | 174/110 S X |
| 4,477,523 | 10/1984 | Biggs et al. | 428/391 X |

FOREIGN PATENT DOCUMENTS

| | | |
|---|---|---|
| 58-118828 | of 0000 | Japan. |
| 58-1741 | of 0000 | Japan. |
| 58-109546 | of 0000 | Japan. |
| 53-087 | 11/1978 | Japan .............................. 174/121 A |
| 55-203 | 6/1980 | Japan .............................. 174/110 PM |
| 167202 | 12/1981 | Japan .............................. 174/121 A |

Primary Examiner—A. T. Grimley
Assistant Examiner—Morris H. Nimmo
Attorney, Agent, or Firm—Oblon, Fisher, Spivak, McClelland & Maier

[57] ABSTRACT

The flame-retardant cross-linked composition is produced as follows: A first compound of a metallic hydrate and a polyolefin resin free from any halogen is mixed with a silane-grafted polyolefin resin free from any halogen to form a second compound; and the second compound is silane cross-linked to form the flame-retardant cross-linked composition. The metallic hydrate is mixed in an amount of about 50 to about 200 parts by weight per about 100 parts by weight of the polyolefin resin and the silane-grafted polyolefin resin, and the polyolefin resin is mixed in an amount of about $(100-x)$ parts by weight where x is the amount of the silane-grafted polyolefin resin and about $10 \leq x \leq$ about 80 parts by weight.

The flame-retardant cross-linked composition is excellent in flame retardancy, thermal resistance and forming property and further advantageous in production cost as compared to the conventional flame-retardant composition. The flame-retardant composition according to the present invention does not produce any toxic gas such as hydrogen halide gas or halogen gas when burned. This flame-retardant cross-linked composition is hence particularly useful for the sheath and the insulation of flame-retardant electric wires, cables and the like.

18 Claims, 3 Drawing Figures

11: CONDUCTOR
19: CARBONIZABLE TAPE
23 & 21 FLAME BARRIER LAYER
17: FILLER MATERIAL
27: BARRIER PROTECTION LAYER
29: CROSS-LINKED SHEATH
15: INSULATION SUB-CORE
13: INSULATION

FLAME-RETARDANT CROSS-LINKED COMPOSITION AND FLAME-RETARDANT CABLE USING SAME

BACKGROUND OF THE INVENTION

1. Field of the Invention

The present invention relates to a flame-retardant cross-linked composition which is excellent to reduce flame propagation and thermal resistance and further relates to a flame-retardant cable having a sheath made of such composition.

2. Description of the Prior Art

As typical flame-retardant resin compositions used for the insulation and the sheath of electric wires and cables, there have been heretofore known compositions such as produced by mixing antimony trioxide as a flame retardant with a polyvinyl chloride resin, chloroprene rubber, chlorosulfonated polyethylene rubber, etc or by mixing antimony trioxide, a chlorine flame retardant or a bromine flame retardant with a polyethylene, ethylene-vinyl acetate copolymer, ethylenepropylene rubber, etc.

Since these compositions contain halogens in their base resins or flame-retardants, they product at high temperatures toxic gases such as a hydrogen halide gas (hydrogen chloride gas, hydrogen bromide gas) and a halogen gas (chlorine gas) in a large amount involving a serious problem in safety. Thus, products using these compositions are not appropriate to use in a place where safety is highly required, for example, underground railway, building, ship, nuclear power plant. Furthermore, there is a disadvantage in that the halogen gases and hydrogen halide gases corrode the adjacent conductor and the like.

In order to improve the conventional flame-retardant resin compositions in thermal resistance in addition to flame retardancy, cross-linking is made on their base resins, for example, polyethylene and ethylenepropylene rubber. Chemical cross-linking and electron beam cross-linking are frequently used for such treatment. In the chemical cross-linking the composition is heat-treated by steam, etc under a high temperature and pressure, and hence a special pressure-resistant receptacle and heating appliances are needed. On the other hand, electron beam cross-linking requires an electron beam emitting chamber and apparatus. Either cross-linking requires rather large cross-linking equipment which largely raises equipment cost and maintenance cost, thus increasing the production cost of the composition.

With respect to the conventional cable, there arises another serious problem in that when the inner structural members of the cable core such as made of polyethylene and cross-linked polyethylene are exposed to flames in a fire, they become molten and flow as a drip to the surface of the cable where they are gasified in a high temperature atmosphere and immediately catch fire, so that the cable burns and makes the fire larger. Further, cables having the insulation and the sheath made of rubbers or plastic materials free of any halogen are inferior in flame retardancy to cables having those components using materials containing a halogen and a halogen flame retardant. For improving the cables having such nonhalogen materials in flame retardancy a great amount of a metallic hydrate is blended in them, but this degrades their physical and electrical properties.

In conventional chemical cross-linking by the use of a peroxide or the like, a material adjacent to the composition to be cross-linked can be deformed because the cross-linking is carried out under a high temperature and pressure. For example, the inner core of the cable can be heat deformed by the cross-linking of the sheath thereof. On the other hand, in electron beam cross-linking it is difficult for an electron beam to reach to the innermost of the composition layer to be cross-linked. For example, in a relatively thick sheath only the surface portion thereof can be cross-linked. Electron beam cross-linking is disadvantageous in that it is particularly difficult to completely cross-link a thick layer of the composition.

SUMMARY OF THE INVENTION

The present invention provides a flame-retardant cross-linked composition and a flame-retardant cable using the same which do not produce any toxic and corrosive gases and smoke when the composition burns under high temperatures, for example, in a fire, thus enhancing safety and eliminating the possibility of the corrosion of adjacent metals and the like by gases produced.

The present invention provides a flame-retardant cross-linked composition and a flame-retardant cable using the same which are excellent in both thermal resistance and forming quality.

The present invention provides a flame-retardant cross-linked composition and a flame-retardant cable using the same in which the cross-linking thereof is carried out without any cross-linking equipment, thus reducing the production cost thereof.

The present invention provides a flame-retardant cable which has an excellent flame-retardant structure.

DESCRIPTION OF THE INVENTION

One aspect of the present invention, provides a flame-retardant cross-linked composition which is produced as follows: A first compound of a metallic hydrate and a polyolefin resin free from any halogen is mixed with a silane-grafted polyolefin resin free from any halogen to form a second compound; and the second compound is silane cross-linked to form the flame-retardant cross-linked composition. The metallic hydrate is mixed in an amount of about 50 to about 200 parts by weight per about 100 parts by weight of the polyolefin resin and the silane-grafted polyolefin resin, and the polyolefin resin is mixed in an amount of about $(100-x)$ parts by weight where x is the amount of the silane-grafted polyolefin resin and about $20 \leq x \leq$ about 80 parts by weight.

The flame-retardant cross-linked composition according to the present invention does not produce any toxic gas such as a hydrogen halide gas or a halogen gas and is excellent in flame retardancy, thermal resistance and forming quality and further advantageous in production cost as compared to the above-mentioned conventional composition. The flame-retardant cross-linked composition according to the present invention is hence particularly useful for the sheath and the insulation of electric wires, cables and the like.

The present invention also provides a flame-retardant cable including: a core having at least one subcore, the subcore including a electric conductor coated with an electrical insulation made of a material free from any halogen; and a sheath made of a flame-retardant cross-linked composition according to the first aspect of the present invention.

The flame-retardant cable according to the present invention may be provided between the core and the sheath with a flame barrier layer for enhancing flame retardancy thereof in combination with the effects of the flame-retardant cross-linked composition.

DESCRIPTION OF THE PREFERRED SUBORDINENTS

Figure 1:
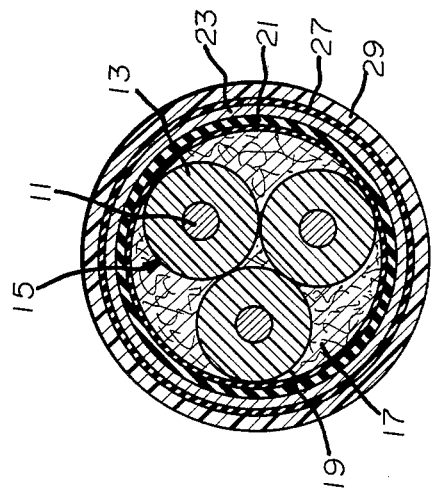
FIG. 1 is a cross-sectional view of a flame-retardant cable according to the present invention.

The polyolefin resin used in the present invention does not contain any halogen. For example, a polyethylene, ethylene-alpha-olefin copolymers, ethylene-propylene copolymers, ethylene-vinyl acetate copolymers, ethylene propylene diene elastomer (EPDM), ethylene-methylacrylate copolymer, polymethylacrylate, polyethylacrylate, polymetaacrylate, ethylene acrylic elastomer, hydrogenated styrene-butadiene rubber and mixture thereof may be used as the polyolefin in the present invention.

As the metallic hydrate, aluminum hydroxide, magnesium hydroxide, basic magnesium carbonate, calcium hydroxide or those hydrates surface-treated with fatty acids, phosphoric esters, silane coupling agents, titanate coupling agents, etc may be used in the present invention. When blended with the polyolefin resin, these metallic hydrates serve to retard combustion of that resin at high temperatures. It is believed that this flame retarding reaction takes place as follows. When the metallic hydrate is heated to high temperatures, crystal water is dissociated and released. The resin which is blended with the metallic hydrate lose heat due to dissociation of the crystal water when heated to high temperatures due to a fire or the like so that the temperature thereof drops, thus retarding the burning of the resin.

Although the amount of the metallic hydrate is determined in view of the desired degree of flame retardancy, compatibility with the resin with which it is to be mixed, etc., it is according to the present invention generally used in an amount of about 50 to about 200 parts by weight, preferably about 80 to about 150 parts by weight per about 20 to about 80 parts by weight of the polyolefin resin. With less than about 50 parts by weight of the metallic hydrate a sufficient amount of the crystal water cannot be released, thus resulting in unacceptable flame retardancy. On the other hand, with more than about 200 parts by weight of the metallic hydrate forming quality of the cross-linkable compound deteriorates.

The silane-grafted polyolefin resin used in the present invention is, for example, a resin in which a vinylalkoxysilane, such as vinyltriethoxysilane, gamma-methacryloxypropyltrimethoxysilane and vinyltrimethoxysilane, or the like is grafted by using organic peroxides to one of the above-mentioned polyolefin resins, and which has an olefin chain having many branches including silanol functional groups and is preferably excellent in compatibility with such polyolefin resins. The silane-grafted polyolefin resin is easily cross-linked and this reaction is accelerated in the presence of moisture, a catalyst, etc., forming a three-dimensional network structure. It is presumed that this silane cross-linking (water cross-linking) is condensation reaction of silanol branches with dehydration, etc. According to the present invention, the silane-grafted polyolefin resin is generally used in an amount of about 20 to about 80 parts by weight wherein the amount of the polyolefin resin as the base polymer is (100−x) parts by weight where x is the amount of the silane-grafted polyolefin resin used. The amount of the silane-grafted polyolefin depends on the desired degree of cross-linking. With less than about 20 parts by weight of the silane-grafted polyolefin resin, any acceptable degree of cross-linking cannot be obtained and the finished product is hence inferior in thermal resistance. With more than about 80 parts by weight of the silane-grafted polyolefin resin, the forming quality of the composition in blending and molding largely deteriorates and the appearance of the finished product is degraded. Preferably, the amount x of the silane-grafted polyolefin resin is from about 20 to about 50 parts by weight. It is one of the important features of the present invention that in order to facilitate the processing of the flame-retardant cross-linked composition of the present invention the first compound, which contains the polyolefin resin and the metallic hydrate, and the silane-grafted polyolefin resin are separately stored and brought into contact when extrusion molding is made.

After the silane-grafted polyolefin resin being blended with the flame-retardant compound, the cross-linking reaction is accelerated by bringing the blended compound in contact with external moisture, catalyst, etc. or by passing it under water, and thus a cross-linked structure is formed in the finished product mainly with the silane-grafted polyolefin resin to thereby improve the product in thermal resistance.

A red phosphorus fire retardant and/or a carbon powder, such as carbon black, thermally expansive graphite, etc., may be blended to the flame-retardant compound. When blended in appropriate amounts, these materials accelerate carbonization of the resin components by high temperature heating to produce a carbonized layer. Therefore, the composition blended with the red phosphorus fire retardant and/or the carbon powder in addition to the metallic hydrate prevents melting and dripping of the composition when it is heated to high temperatures, so that spread of the burning of the resins is avoided or at least reduced to thereby enhance flame retardancy. It is believed that the acceleration of carbonization of the compound by the red phosphorus fire retardant is caused by a reaction that the phosphorus obtains hydrogen from the resins when it changes into hydrogen phosphate, etc. by oxidization due to high temperature heating, and that the carbon powder serves to accelerate carbonization of the resins during burning thereof and to thereby prevent the dripping of the molten resins by the firm carbide layer thus formed.

The carbon powder is generally used in the present invention in an amount of about 5 to about 70 parts by weight, preferably about 10 to about 40 parts by weight, per 100 parts by weight of the polyolefin resin plus silane-grafted polyolefin resin, i.e., 100 parts by weight in the total amount of the polyolefin resin and the silane-grafted polyolefin resin. With less than about 5 parts by weight of the carbon powder the acceleration of carbonization of the resins is not sufficiently performed and hence the dripping of the molten resins cannot be prevented. On the other hand, with more than about 70 parts by weight the forming quality of the composition largely deteriorates.

The red phosphorus fire retardant used in the present invention may be red phosphorus or a fire retardant containing red phosphorus and is required to contain red phosphorus in an amount of about 2 to about 50 parts by weight, preferably about 10 to about 30 parts by weight, per 100 parts by weight of the polyolefin resin plus the silane-grafted polyolefin resin. Outside the specified range the fire retardant is largely degraded in its capacity to accelerate the carbonization of the resins.

In preparing the cross-linked composition according to the present invention to produce an electrical insulating material, sheath or the like, it is preferable in view of the forming quality of the second compound to separately prepare the silane-grafted polyolefin resin and to sealingly store it in an aluminum foil-laminated bag so that external moisture is prevented from entering it. On the other hand, in preparing the first compound, the metallic hydrate is added to the polyolefin resin and if necessary an antioxidant, catalyst, processing aid and one or both of the red phosphorus fire retardant and the carbon powder may be further added to the polyolefin resin. These materials are homogeneously blended by means of roller mill, banbury mixer, kneader, etc. to thereby produce the flame-retardant compound which is also sealingly stored. This flame-retardant compound is then formed in the conventional manner into a desired shape and thereafter undergoes silane cross-linking as already described.

Figure 2:
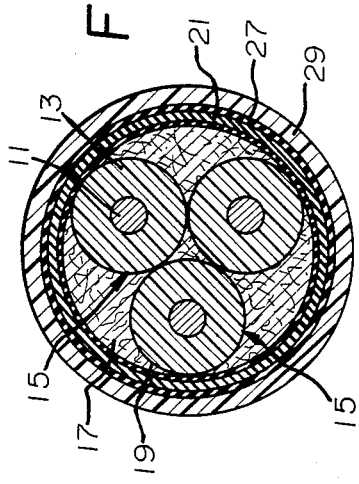
FIG. 2 is a cross-sectional view of a modified form of the cable in FIG. 1.
Figure 3:
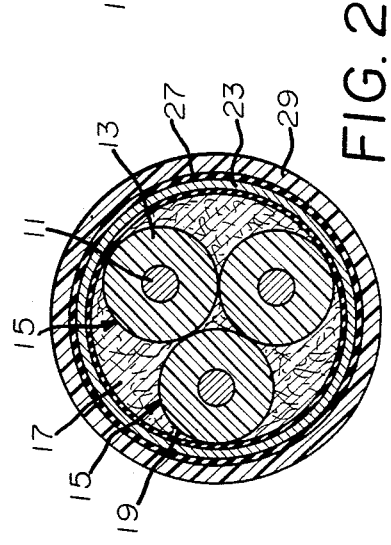
FIG. 3 is a cross-sectional view of another modification of the cable of FIG. 1.

With reference to FIGS. 1 to 3, there are illustrated three kinds of flame-retardant multi-core cables according to another aspect of the present invention, each having a sheath made of the flame-retardant cross-linked composition according to the first aspect of the invention. In the figures, the reference numeral 11 designates a conductor, around which is conventionally coated an electric insulation 13 made of, for example, polyethylene, cross-linked polyethylene (hereinafter referred to as XLPE), natural rubber, butyl rubber, silicone rubber, ethylene propylene rubber (EPR), ethylene propylene diene elastomer (EPDM), ethylene-vinyl acetate copolymer, ethylene-methyl acrylate copolymer, ethylene-alpha-olefin copolymer, ethylene acrylic elastomer, hydrogenated styrene-butadiene elastomer, mixtures thereof or the like. The insulation 13 may be made of a blend of these nonhalogen materials or these materials which are flame-retardant by adding the previously-mentioned nonhalogen flame retardant. The conductor 11 and the insulation 13 constitute an insulation subcore 15. When the insulation 13 is made of XLPE, conventional chemical or electron beam cross-linking may be adopted for cross-linking the polyethylene. In chemical cross-linking there are used an organic peroxide, such as DCP (dicumylperoxide), 2,5-dimethyl-2,5 -di(t-butylperoxine)hexane, cumenehydroperoxide and t-butylperoxipivalate, and a silane coupling agent such as VTMS (vinyltrimethoxysilane), vinyltriethoxysilane, γ-metacryl oxypropyl trimethoxysilane, vinyltris(β-methoxyethoxy)silane, γ-metaacryl oxypropyl methyl dimethoxysilane.

The insulation 13 may be formed according to silane cross-linking of the already-described flame-retardant cross-linked composition of the present invention.

Three subcores 15 are twisted together with an filler 17 to form a core, the filler 17 including jute, paper, nonhygroscopic paper, flame-retardant paper, nonhygroscopic flame-retardant paper, polyethylene drawn yarn, flame-retardant polypropylene (PP), polypropylene yarn, tetron yarn, polyethylene terephthalate film, etc. Around this core there is formed a carbonizable tape layer 19 which may be made of a kraft paper, acrylic fiber cloth, rayon cloth, natural cellulosic fiber, those materials impregnated with a silicone varnish, alkyd varnish or the like. This carbonizable tape is wound around the core to form the layer 19 and may be carbonized when heated. However, this carbonizable layer 19 may be omitted.

Around the carbonizable tape layer 19 there is formed a flame barrier layer 21 or 23 which protects the insulations 11 and the filler 17 from a fire. In the cable shown in FIG. 1, the flame barrier layer 21 is formed by winding one or several pieces of fireproof inorganic tapes with 1/5 to ½ overlap, the tapes containing a ceramic or the like and having, for example, about 0.05-0.2 mm thickness. The fireproof inorganic tape includes, for example, mica Mylar laminated tape, mica glass tape, mica-paper composite tape, asbestos tape, mica-paper laminated tape, silicone- or alkyl varnish-applied glass tape, composite of a glass fiber and an alumina-silica molten yarn tape such as Kaowool and ceramic fiber, alumina-glass-laminated tape and the like. In the cable shown in FIG. 2, the flame barrier layer 23 is formed by winding one or a few pieces of one or two kinds of metallic tapes or tapes containing a metal in a larger proportion, with 1/5 to ½ overlap. These tapes have, for example, about 0.03-0.2 mm thickness and includes copper, steel, stainless steel (SUS), brass, aluminum, aluminum-Mylar laminated tapes and the like. Further in the cable illustrated in FIG. 3, the flame barrier layer 21, 23 consists of an inorganic tape layer and a metallic tape layer as used in the cables in FIGS. 1 and 2 respectively. Each layer is formed by winding one or several tapes with 1/5 to ½ overlap. The inorganic tape layer is preferably disposed inside the metallic tape layer. However, the inorganic and metallic tapes may be alternatively wound around the carbonizable layer 19. As described above, it is necessary to form each of the carbonizable tape layer 19 and the barrier tape layers 21, 23 by winding the tape around the underlying layer in an overlapping manner. With the other winding manners molten and gasified flammables can be ejected out from the inside during burning of the cable.

Around the flame barrier layers 21, 23 thus formed, there may be wound a barrier protection layer 27 which protects those flame barrier layer. The barrier protection layer 27 is formed by winding a tape made of, for example, asbestos, glass, ceramic fiber, a composite of these materials or the like.

Further, a cross-linked sheath 29 is formed around the barrier protection layer 27. The cross-linked sheath 29 is made of the previously-described flame-retardant cross-linked composition according to the first aspect of the present invention.

In the cable in FIG. 1, the flame barrier layer 21 is formed of an inorganic tape containing a ceramic in a larger proportion and is hence excellent from its nature in thermal resistance. When the layer 21 is heated in a fire, it is not easily destroyed, so that transmittance of heat and supply of air to the inside of the cable core are effectively prevented to thereby sufficiently protect the core inside and appropriately carbonize the underlying carbonizable layer 19. Even if the insulation 13 of the cable core 15 becomes molten by the temperature rise in the cable, the flame barrier layer 21 sufficiently prevents the molten insulation 13 from flowing outside the cable in combination with the blockage of the carbonizable tape layer 19 which becomes carbonized to form a kind of biscuit wall.

In the cable in FIG. 2, the flame barrier layer 23 of a metallic tape, which is also excellent in thermal resistance, is superior in sealing quality to the flame barrier layer 21 and hence almost completely prevents the transpiration of the molten drips of the insulation, etc. through it. The use of aluminum foil as the flame barrier layer 23 is preferable in the production cost.

In the double- or multi-layer structure of the flame barrier layer, including the inorganic layer 21 and the metallic tape layer 23, shown in FIG. 3, combined effects of the inorganic and metallic layers are produced and superior results are hence obtained.

The barrier protection layer 27, which is provided around flame barrier layer 21 or 23, mechanically protects and reinforces the latter against outer force. Further, the protection layer 27 which is low in heat conduction from its nature provides thermal protection against fire to the flame barrier layer 21, 23 to thereby prevent or reduce a rise in temperature of the sheath 29.

The sheath 29 is formed by mixing the silane-grafted polyolefin resin and the flame-retardant compound which are prepared according to the first aspect of the present invention and then extruding them around the barrier protection layer 27 in a conventional manner to thereby produce each cable. The insulation 13 may be formed in the same manner.

Although the present invention has been illustrated about multi-core cables, it may be applied to a single-core cable.

In the above-described embodiments of the present invention, the flame retardant cables are provided with the carbonizable layer, the barrier layer and the protection layer. It is however to be noted that those layers are not necessarily provided, and that even if the layers are omitted, in a certain use good flame retardancy can be achieved and no toxic gases can be produced.

EXAMPLES

Examples 1-6

Silane-grafted polyolefin resins A and B were separately prepared in compositions shown in TABLE 1 according to the following procedures. In each procedure, dicumylperoxide (DCP) was dissolved in vinyltrimethoxysilane, to which is then added a high density polyethylene powder to prepare a compound in the form of a paste. This paste was homogeneously mixed into an ethylene-α-olefin copolymer manufactured by Mitsui Petrochemical Ind. Ltd., Japan and sold under a Japanese tradename "Tafmer A-4085" to form a mixture, which was then extruded by a conventional extruder having a cylinder of 40 mm diameter at an extrusion temperature of 200° C. with a residence time of 4 to 5 minutes to thereby obtain each of silane-grafted polyolefin resins A and B in the form of pellets. The resins A and B thus produced were each sealingly stored in an aluminum foil-laminated bag with external moisture and the like shut off.

TABLE 1

|  | parts by weight | |
| --- | --- | --- |
|  | Silane-grafted polyolefin resin A | Silane-grafted polyolefin resin B |
| Ethylene-α-olefin copolymer | 100 | 100 |
| DCP | 0.3 | 0.3 |
| Vinyltrimethoxysilane | 4 | 2 |
| High density polyethylene* | 2 | 2 |

*having a density of 0.95

Each batch for use in Examples 1 to 6 was prepared in compositions shown in TABLE 2 according to the following procedure. To the ethylene-α-olefin copolymer as described above in connection with the silane-grafted polyolefin resins A and B there were added and mixed aluminum hydroxide, magnesium hydroxide, red phosphorus fire retardant, carbon black, stearic acid as lubricant, a conventional antioxidant, silane condensation catalyst and DCP according to the compounding recipe in TABLE 2 to produce each flame retardant compound (the first compound) in the form of pellets. The condensation catalyst was dibutyltindilaurate (DBTDL). This mixing was carried out by means of a Banbury mixer at 160° C. or higher. Then, the flame retardant compounds thus prepared were each sealingly stored in an aluminum foil-laminated bag with external moisture and the like being shut off from entering it.

Thereafter, the thus-prepared silane-grafted polyolefin resin A or B and each of flame-retardant compounds in Examples 1 to 6 were mixed according to the compounding recipe in TABLE 2 to prepare a second compound, which was extruded over a copper conductor having 0.9 mm diameter by a conventional extruder to thereby produce an insulated wire having a coating of thickness about 2.8 to 3 mm for each example.

The insulated wire thus prepared was subjected to a heat aging test and a heat deformation test to determine characteristics thereof. In the heat agent test, each insulated wire was measured as to tensile strength and elongation after they were allowed to stand at 120° C. for 7 days or at 100° C. for 2 days. In the heat deformation test, the degree of thermal deformation of each insulated wire was measured according to IEC 92-3 under a condition that it was heated at 90° C. for one hour with an applied load of 1 Kg. In order to examine the flame retardancy of the tube of the insulated wire of each example, oxygen index was measured according to ASTM D-2863. In order to examine the toxic and corrosive gases produced, halogen halide gas was measured according to IEC-754.

TABLE 2

|  | Parts by Weight EXAMPLE | | | | | |
| --- | --- | --- | --- | --- | --- | --- |
|  | 1 | 2 | 3 | 4 | 5 | 6 |
| Silane grafted polyolefin resin A | 20 | 30 | — | 50 | 60 | 80 |
| Silane grafted polyolefin resin B | — | — | 30 | — | — | — |
| Ethylene-α-olefin copolymer | 80 | 70 | 70 | 50 | 40 | 20 |
| Aluminum hydroxide | 100 | 100 | — | 100 | 100 | 100 |
| Magnesium hydroxide*1 | — | — | 100 | — | — | — |
| Red phosphorus fire retardant*2 | 30 | 30 | 30 | 30 | 30 | 30 |
| Carbon black | 20 | 20 | 20 | 20 | 20 | 20 |
| Antioxidant*3 | 1 | 1 | 1 | 1 | 1 | 1 |
| Stearic acid | 1 | 1 | 1 | 1 | 1 | 1 |
| DBTDL catalyst | 0.1 | 0.1 | 0.1 | 0.1 | 0.1 | 0.1 |
| DCP*4 | — | — | — | — | — | — |

TABLE 2-continued

| | Parts by Weight EXAMPLE | | | | | |
|---|---|---|---|---|---|---|
| | 1 | 2 | 3 | 4 | 5 | 6 |
| Before aging | | | | | | |
| Tensile strength (Kg/mm²) | 1.2 | 1.1 | 1.2 | 1.1 | 1.3 | 1.0 |
| Elongation (%) | 500 | 360 | 470 | 207 | 180 | 160 |
| After aging 7 days at 120° C. | | | | | | |
| Tensile strength retention (%) | 105 | 102 | 115 | 114 | 112 | 120 |
| Elongation retention (%) | 85 | 89 | 85 | 82 | 87 | 80 |
| After aging 10 days at 100° C. | | | | | | |
| Tensile strength retention (%) | 102 | 107 | 110 | 105 | 103 | 107 |
| Elongation retention (%) | 93 | 91 | 100 | 92 | 95 | 91 |
| Heat deformation*5 (%) | 48 | 22 | 32 | 17 | 15 | 13 |
| Oxygen index*6 | 32 | 32 | 32 | 32 | 32 | 32 |
| Hydrogen halide gases*7 (mg/g) | 0 | 0 | 0 | 0 | 0 | 0 |
| Extruding moldability*8 | x | x | x | x | xx | xx |

*1 surface treated with stearic acid;
*2 a conventional fire retardant containing 24% by weight of red phosphorus;
*3 antioxidant manufactured and sold by Ciba-Geigy, Switzerland, under the tradename "Irganox #1076";
*4 Dicumyl peroxide curing agent;
*5 according to IEC 92-3 at 90° C. with a load of 1 Kg;
*6 according to ASTM D-2863;
*7 test according to IEC-754-1; and
*8 x, xx and xxx indicate good, acceptable and not acceptable respectively.

The results of these tests are given in TABLE 2, from which it will be noted that insulated wires from Examples 1-4 which fall within the preferable range of the present invention was superior in extruding moldability and elongation before aging to insulated wires from Examples 5 and 6.

Comparative Examples 1-5

With the use of the apparatus and procedure of the Examples 1-6, there were prepared four kinds of insulated wires for Comparative Examples 1-4 according to the compounding recipes given in TABLE 3. The compounds of Comparative Examples 1 and 5 did not contain any silane-grafted polyolefin resin. For Comparative Example 5 another coated wire was prepared in the same manner as in the preceding examples except that the compound thereof contained DCP and that after being extruded it underwent steam cross-linking. These insulated wires were subjected to the same tests as in Examples 1-6.

The results of the tests are given in TABLE 3. The cross-linked compositions from Comparative Examples 1 and 2, in which the cross-linkable component was not used or used in amount below the lower limit of the scope of the present invention, were unacceptable since it largely deformed in the heat deformation test and became molten or slightly molten in the aging tests. The cross-linked compounds from Comparative Examples 3 and 4, in which the cross-linkable component was used in an amount beyond the upper limit of the present invention, were also unacceptable since extruding moldability was poor. The cross-linked compound from Comparative Example 5, in which DCP was used for cross-linking, exhibited acceptable results in all the tests but it required a high temperature and high pressure equipment for cross-linking. During the DCP cross-linking of the sheath of a cable, cores thereof can become molten and adhered together, and hence the cables using a DCP cross-linked sheath has a restriction in materials to be used for the core thereof. On the other hand, silane cross-linking adopted in the present invention does not need any cross-linking equipment and does not have such restriction in the materials.

TABLE 3

| | Parts by Weight COMPARATIVE EXAMPLE | | | | |
|---|---|---|---|---|---|
| | 1 | 2 | 3 | 4 | 5 |
| Silane grafted polyolefin resin A | — | 15 | 90 | 100 | — |
| Silane grafted polyolefin resin B | — | — | — | — | — |
| Ethylene-α-olefin copolymer | 100 | 85 | 10 | — | 100 |
| Aluminum hydroxide | 100 | 100 | 100 | — | 100 |
| Magnesium hydroxide*1 | — | — | — | 100 | — |
| Red phosphorus fire retardant*2 | 30 | 30 | 30 | 30 | 30 |
| Carbon black | 20 | 20 | 20 | 20 | 20 |
| Antioxidant*3 | 1 | 1 | 1 | 1 | 1 |
| Stearic acid | 1 | 1 | 1 | 1 | 1 |
| DBTDL catalyst | — | 0.1 | 0.1 | 0.1 | — |
| DCP*4 | — | — | — | — | 2.5 |
| Before aging | | | | | |
| Tensile strength (Kg/mm²) | 0.8 | 1.2 | 0.7 | 0.6 | 1.3 |
| Elongation (%) | 520 | 490 | 100 | 80 | 450 |
| After aging 7 days at 120° C. | | | | | |
| Tensile strength retention (%) | molten | molten | 130 | 132 | 92 |
| Elongation retention (%) | molten | molten | 82 | 87 | 90 |
| After aging 10 days at 100° C. | | | | | |
| Tensile strength retention (%) | molten | slightly softened | 115 | 121 | 95 |
| Elongation retention (%) | molten | slightly softened | 90 | 87 | 97 |
| Heat deformation*5 (%) | 100 | 56 | 12 | 10 | 8 |
| Oxygen index*6 | 32 | 32 | 32 | 33 | 34 |
| Hydrogen halide gases*7 (mg/g) | 0 | 0 | 0 | 0 | 0 |
| Extruding moldability*8 | x | x | xxx | xxx | x |

Examples 7-32

With the use of the apparatus and procedure of Examples 1-6, there was prepared an insulated wire for each example according to the compounding recipes given in TABLES 4 and 5, in which Examples 7-10 and 20-23 showed preferable compositions in view of extrusion moldability and other properties. Examples 7-19 showed various combinations in composition of aluminum hydroxide with other flame retardants. Examples 20-32 demonstrated various combinations in composition of magnesium hydroxide with other flame retardants.

These insulated wires were subjected to the same tests as in Examples 1-6, of which results are also given in TABLES 4 and 5.

The cross-linked compositions from Examples 11-13 and 24-26. in which the silane grafted polyolefin resin was used in amounts beyond the preferable range of the present invention, were inferior in extrusion moldability and elongation before the aging tests to the cross-linked compositions from Examples 7-10 and 20-23 respectively.

From Examples 14 and 27, in which the flame retardant compounds contained only metallic hydrates as the flame retardant beyond the preferable range of the present invention, it was noted that extruding moldability was degraded. Such high concentration of metallic hydrates can in fact cause heat generation within the extruder during extrusion resulting in foaming in finished products. In order to obtain high flame retardancy it is suitable to use metallic hydrates together with carbon black and the red phosphorus fire retardant in an appropriate amount.

had a coating thickness 1.0 mm and the insulation in Examples 45–54 was made of a nonhalogen flame-retardant cross-linked polyolefin compound and had a

TABLE 4

| | Parts by Weight EXAMPLE | | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 | 19 |
| Silane grafted polyolefin resin A | 20 | 30 | 40 | 50 | 60 | 70 | 80 | 20 | 20 | 20 | 20 | 20 | 20 |
| Ethylene-α-olefin copolymer | 80 | 70 | 60 | 50 | 40 | 30 | 20 | 80 | 80 | 80 | 80 | 80 | 80 |
| Aluminum hydroxide | 150 | 130 | 120 | 100 | 80 | 70 | 50 | 200 | 100 | 50 | 130 | 130 | 50 |
| Red phosphorus fire retardant[*2] | 10 | 10 | 20 | 30 | 30 | 30 | 30 | — | 50 | — | 2 | 30 | 50 |
| Carbon black | 10 | 10 | 20 | 30 | 30 | 40 | 30 | — | — | 70 | 20 | 5 | 50 |
| Antioxidant[*3] | 1 | 1 | 1 | 1 | 1 | 1 | 1 | 1 | 1 | 1 | 1 | 1 | 1 |
| Stearic acid | 1 | 1 | 1 | 1 | 1 | 1 | 1 | 1 | 1 | 1 | 1 | 1 | 1 |
| DBTDL catalyst | 0.1 | 0.1 | 0.1 | 0.1 | 0.1 | 0.1 | 0.1 | 0.1 | 0.1 | 0.1 | 0.1 | 0.1 | 0.1 |
| Before aging | | | | | | | | | | | | | |
| Tensile strength (Kg/mm$^2$) | 1.1 | 1.0 | 1.1 | 1.1 | 1.0 | 1.1 | 1.0 | 0.9 | 0.8 | 1.2 | 1.0 | 0.9 | 0.8 |
| Elongation (%) | 300 | 290 | 260 | 230 | 210 | 190 | 180 | 220 | 350 | 250 | 350 | 370 | 210 |
| After aging 7 days at 120° C. | | | | | | | | | | | | | |
| Tensile strength retention (%) | 111 | 110 | 125 | 115 | 121 | 108 | 100 | 105 | 120 | 117 | 102 | 120 | 115 |
| Elongation retention (%) | 97 | 95 | 89 | 87 | 89 | 90 | 98 | 100 | 90 | 102 | 100 | 105 | 90 |
| After aging 10 days at 100° C. | | | | | | | | | | | | | |
| Tensile strength retention (%) | 94 | 102 | 110 | 107 | 106 | 113 | 102 | 114 | 105 | 101 | 101 | 110 | 98 |
| Elongation retention (%) | 98 | 98 | 93 | 94 | 91 | 97 | 97 | 97 | 102 | 92 | 101 | 105 | 91 |
| Heat deformation[*5] (%) | 35 | 21 | 18 | 17 | 16 | 15 | 14 | 30 | 38 | 46 | 37 | 35 | 37 |
| Oxygen Index[*6] | 34 | 33 | 33 | 33 | 30 | 30 | 26 | 35 | 32 | 24 | 33 | 35 | 27 |
| Hydrogen halide gases[*7] (mg/g) | 0 | 0 | 0 | 0 | 0 | 0 | 0 | 0 | 0 | 0 | 0 | 0 | 0 |
| Extruding moldability[*8] | x | x | x | x | xx | xx | xx | xx | x | xx | x | x | xx |

TABLE 5

| | Parts by Weight EXAMPLE | | | | | | | | | | | | |
|---|---|---|---|---|---|---|---|---|---|---|---|---|
| | 20 | 21 | 22 | 23 | 24 | 25 | 26 | 27 | 28 | 29 | 30 | 31 | 32 |
| Silane grafted polyolefin resin A | 20 | 30 | 40 | 50 | 60 | 70 | 80 | 20 | 20 | 20 | 20 | 20 | 20 |
| Ethylene-α-olefin copolymer | 80 | 70 | 60 | 50 | 40 | 30 | 20 | 80 | 80 | 80 | 80 | 80 | 80 |
| Magnesium hydroxide[*1] | 150 | 130 | 120 | 100 | 80 | 70 | 50 | 200 | 100 | 50 | 130 | 130 | 50 |
| Red phosphorus fire retardant[*2] | 10 | 10 | 20 | 30 | 30 | 30 | 30 | — | 50 | — | 2 | 30 | 50 |
| Carbon black | 10 | 10 | 20 | 30 | 30 | 40 | 30 | — | — | 70 | 20 | 5 | 50 |
| Antioxidant[*3] | 1 | 1 | 1 | 1 | 1 | 1 | 1 | 1 | 1 | 1 | 1 | 1 | 1 |
| Stearic acid | 1 | 1 | 1 | 1 | 1 | 1 | 1 | 1 | 1 | 1 | 1 | 1 | 1 |
| DBTDL catalyst | 0.1 | 0.1 | 0.1 | 0.1 | 0.1 | 0.1 | 0.1 | 0.1 | 0.1 | 0.1 | 0.1 | 0.1 | 0.1 |
| Before aging | | | | | | | | | | | | | |
| Tensile strength (Kg/mm$^2$) | 1.0 | 1.0 | 1.0 | 1.0 | 0.9 | 1.0 | 0.9 | 0.8 | 0.7 | 1.1 | 0.9 | 0.8 | 0.7 |
| Elongation (%) | 320 | 310 | 280 | 260 | 230 | 210 | 200 | 240 | 370 | 280 | 370 | 380 | 230 |
| After aging 7 days at 120° C. | | | | | | | | | | | | | |
| Tensile strength retention (%) | 110 | 104 | 115 | 93 | 117 | 105 | 112 | 95 | 111 | 100 | 90 | 121 | 107 |
| Elongation retention (%) | 90* | 88 | 83 | 82 | 84 | 85 | 82 | 94 | 84 | 100 | 94 | 99 | 82 |
| After aging 10 days at 100° C. | | | | | | | | | | | | | |
| Tensile strength retention (%) | 97 | 96 | 100 | 90 | 93 | 99 | 97 | 102 | 101 | 92 | 97 | 111 | 101 |
| Elongation retention (%) | 100 | 98 | 92 | 92 | 90 | 95 | 90 | 102 | 98 | 88 | 93 | 101 | 87 |
| Heat deformation[*5] (%) | 37 | 23 | 20 | 19 | 18 | 17 | 16 | 31 | 39 | 48 | 39 | 37 | 39 |
| Oxygen Index[*6] | 34 | 33 | 33 | 33 | 31 | 30 | 26 | 35 | 32 | 25 | 33 | 35 | 27 |
| Hydrogen halide gases[*7] (mg/g) | 0 | 0 | 0 | 0 | 0 | 0 | 0 | 0 | 0 | 0 | 0 | 0 | 0 |
| Extruding moldability[*8] | x | x | x | x | xx | xx | xx | xx | x | xx | x | x | xx |

Examples 33–54

For each example there was prepared in the following manner a sample cable including three subcores, as shown in FIGS. 1–3, each having a copper conductor of 5.5 mm$^2$ cross-sectional area. An insulation was extruded over each conductor and then cross-linked with steam to form a subcore having 5.0 mm diameter. In Examples 33–44 the insulation was made of XLPE and 1.0 mm coating thickness, the compound consisting of ethylene-α-olefin copolymer (100 parts by weight), magnesium hydroxide (80 parts by weight), DCP (2 parts by weight) and anti-oxidant (1 part by weight). Three subcores thus prepared were twisted in a conventional manner together with a kraft paper tape of 90 μm thickness as a filler to form a core, and subsequently the carbonizable tape, flame barrier tape and barrier protection tape were, as shown in TABLE 6, wound around the core in a conventional manner. These carbonizable tape, flame barrier tape and barrier protection tape were wound in overlapping manner. Finally, a sheath shown in TABLE 6 was extruded around the core thus prepared at an extrusion temperature of 120°–150° C. to produce a cable which was then water cooled and wound on a reel. These samples were subjected to the IEEE standard 383 test (vertical tray flame test). Further, the concentration of hydrogen halide gas produced by this test and the distance visible through smoke produced were measured.

The results of the vertical tray flame test were given in TABLE 7, and it was noted that the results of all the examples were acceptable. It was further noted from Examples 33–54 that the hydrogen halide gas concentration was 0 PPM, and that the distance visible through smoke produced was more than 100 m. From these results, it is clear that during burning, the cables which fall within the scope of the invention produced smoke in a small amount and no hydrogen halide gas, and they had sufficient flame retardancy. It was further noted that no other toxic and corrosive gas was produced.

Comparative Example 6

For comparison purposes, a sample cable was prepared in the following manner. A PVC resin was conventionally extruded over a copper conductor of 5.5 mm$^2$ cross-sectional area to form a subcore having a coating of 1.0 mm thickness, the subcore having 5.0 mm diameter. Three subcores thus prepared were twisted in a conventional manner together with a jute as a filler to form a core, around which a flame retardant PVC was then extruded to produce a cable having a sheath of 1.5 mm thickness. This sample was subjected to the same tests as in Examples 33–54.

The results of the vertical tray flame test were given in TABLE 7 and were acceptable. It was however noted that the distance visible through smoke produced was 1 m, and that hence this cable produced smoke in a much larger amount than the cables of Examples 33–54. It was further noted that hydrogen halide gas was produced in an amount of 530 PPM which was beyond a level as will provide a hazard to the human being and will corrode adjacent devices such as electrical contacts.

TABLE 6

| Example | Carbonizable Tape Layer | Flame Barrier Layer | Barrier Protection Layer | Sheath |
|---|---|---|---|---|
| 33 | — | mica-glass tape A*9 | — | sheath A*10 |
| 34 | kraft paper A*11 | mica-glass tape A | — | sheath A |
| 35 | — | mica-glass tape A | glass tape A*12 | sheath A |
| 36 | kraft paper A | mica-glass tape A | glass tape A | sheath E*17 |
| 37 | — | aluminum Mylar tape A*13 | — | sheath A |
| 38 | kraft paper A | aluminum Mylar tape A | — | sheath A |
| 39 | — | aluminum Mylar tape A | glass tape A | sheath C*15 |
| 40 | kraft paper A | aluminum Mylar tape A | glass tape A | sheath A |
| 41 | — | mica-glass tape A and aluminum Mylar tape A | — | sheath A |
| 42 | kraft paper A | mica-glass tape A and alumium Mylar tape A | — | sheath A |
| 43 | — | mica-glass tape A and aluminum Mylar tape A | glass tape A | sheath F*18 |
| 44 | kraft paper A | mica-glass tape A and aluminum Mylar tape A | glass tape A | sheath A |
| 45 | — | mica-glass tape A | — | sheath A |
| 46 | kraft paper A | mica-glass tape A | — | sheath A |
| 47 | — | mica-glass tape A | glass tape A | sheath A |
| 48 | — | aluminum Mylar tape A | — | sheath A |
| 49 | kraft paper A | aluminum Mylar tape A | — | sheath A |
| 50 | — | aluminum Mylar tape A | glass tape A | sheath A |
| 51 | — | mica-glass tape A and aluminum Mylar tape A | — | sheath A |
| 52 | — | — | — | sheath A |
| 53 | — | — | — | sheath B*14 |
| 54 | — | — | — | sheath C*15 |
| Comparative Example 6 | — | — | — | sheath D*16 |

*9 a piece of mica-glass tape of 0.13 mm thickness wound with ¼ overlap;
*10 the flame retardant cross-linked composition prepared in Example 3 and having 1.5 mm thickness;
*11 a sheet of kraft paper of 90 μm thickness wound with ¼ overlap;
*12 a piece of glass tape of 0.13 mm thickness with ¼ overlap;
*13 a piece of aluminum Mylar laminated tape of 50 μm thickness wound with ¼ overlap;
*14 the flame retardant cross-linked composition used in Example 14 and having 1.5 mm thickness;
*15 the flame retardant cross-linked composition as used in Example 31 and having 1.5 mm thickness;
*16 a flame retardant PVC and having 1.5 mm thickness.
*17 the flame retardant cross-linked composition used in Example 27 and having 1.5 mm thickness; and
*18 the flame retardant cross-linked composition used in Example 10 and having 1.5 mm thickness.

Examples 55–62 and Comparative Examples 7–9

With the use of the apparatus and procedure of Examples 1–6, there was prepared a flame-retardant composition for each example in compounding recipes given in TABLE 8. These compositions were measured as to oxygen index and heat deformation. The results are also given in TABLE 8.

TABLE 7

| | Vertical Tray distance of burned sheath | Flame Test Judgement | Hydrogen Halide gas Concentration | Distance Visible Through Gases Produced |
|---|---|---|---|---|
| Example | | | | |
| 33 | 150 cm | acceptable | 0 PPM | more than 100 m |
| 34 | 140 | " | " | " |
| 35 | 145 | " | " | " |
| 36 | 130 | " | " | " |
| 37 | 140 | " | " | " |
| 38 | 130 | " | " | " |
| 39 | 135 | " | " | " |
| 40 | 120 | " | " | " |
| 41 | 100 | " | " | " |
| 42 | 90 | " | " | " |
| 43 | 95 | " | " | " |
| 44 | 85 | " | " | " |
| 45 | 90 | " | " | " |
| 46 | 80 | " | " | " |
| 47 | 85 | " | " | " |
| 48 | 85 | " | " | " |
| 49 | 75 | " | " | " |
| 50 | 80 | " | " | " |
| 51 | 70 | " | " | " |
| 52 | 130 | " | " | " |
| 53 | 150 | " | " | " |
| 54 | 115 | " | " | " |
| Comparative Example 6 | 120 | " | 530 | 1 m |

TABLE 8

| | EXAMPLE | | | | | | | | COMPARATIVE EXAMPLE | | |
|---|---|---|---|---|---|---|---|---|---|---|---|
| | 55 | 56 | 57 | 58 | 59 | 60 | 61 | 62 | 7 | 8 | 9 |
| Silane-grafted polyolefin | 20 | 30 | 30 | 40 | 50 | 30 | 30 | 30 | — | 100 | 30 |
| Ethylene-α-olefin copolymer | 80 | 70 | 70 | 60 | 50 | 70 | 70 | 70 | 100 | — | 70 |
| Aluminum hydroxide | — | — | 120 | — | — | — | — | — | — | — | — |
| Magnesium hydroxide[1] | 120 | 120 | — | 120 | 120 | 130 | 140 | 150 | 120 | 120 | 40 |
| Red phosphorus flame retardant[19] | 10 | 10 | 10 | 10 | 10 | — | 10 | — | 10 | 10 | 30 |
| Carbon black | 20 | 20 | 20 | 20 | 20 | 20 | — | — | 20 | 20 | 40 |
| Antioxidant[3] | 1 | 1 | 1 | 1 | 1 | 1 | 1 | 1 | 1 | 1 | 1 |
| Stannum catalyst[20] | 0.1 | 0.1 | 0.1 | 0.1 | 0.1 | 0.1 | 0.1 | 0.1 | 0.1 | 0.1 | 0.1 |
| Stearic acid | 1 | 1 | 1 | 1 | 1 | 1 | 1 | 1 | 1 | 1 | 1 |
| Extrusion moldability[8] | x | x | x | x | x | x | x | x | x | xxx | x |
| Oxygen index[6] | 31 | 31 | 30 | 31 | 31 | 30 | 30 | 31 | 30 | 31 | 25 |
| Heat deformation[5] | 40% | 30% | 28% | 22% | 17% | 27% | 28% | 28% | 100% | 10% | 45% |

[19] a conventional fire retardant containing 20% by weight of red phosphorus.
[20] DBTDL catalyst

What is claimed is:

1. A flame-retardant cross-linked composition produced by:
    (a) mixing a first compound of a polyolefin resin and a metallic hydrate with a silane-grafted polyolefin resin to form a second compound, both the resins being free of any halogen;
    (b) silane cross-linking the second compound to form the flame-retardant cross-linked composition; and
    (c) wherein the metallic hydrate is mixed in an amount of about 50 to about 200 parts by weight per 100 parts by weight of both the polyolefin resin and the silane-grafted polyolefin resin, and the polyolefin resin is mixed in an amount of about $(100-x)$ parts by weight wherein x is the amount of the silane-grafted polyolefin resin and is $20 \leq x \leq 80$ parts by weight.

2. The flame-retardant cross-linked composition of claim 1, wherein the first compound contains about 5 to about 70 parts by weight of a carbon powder per 100 parts by weight of the polyolefin resin and the silane-grafted polyolefin resin together.

3. The flame-retardant cross-linked composition of claim 2, wherein the first compound contains further a red phosphorus flame retardant including about 2 to about 50 parts by weight of red phosphorus per 100 parts by weight of the polyolefin resin and the silane-grafted polyolefin resin together.

4. The flame-retardant cross-linked composition of claim 1 wherein the polyolefin resin is a resin selected from the group consisting of a polyethylene, ethylenealpha-olefin copolymer, ethylene-propylene copolymer, ethylene-vinyl acetate copolymer, ethylene propylene diene elastomer, ethylene-methylacrylate copolymer, polymethylacrylate, polyethylacrylate, polymetaacrylate, ethylene acrylic elastomer, hydrogenated styrene-butadiene rubber and their mixtures.

5. The flame-retardant cross-linked composition of claim 4, wherein the metallic hydrate is a substance selected from the group consisting of aluminum hydroxide, magnesium hydroxide, calcium hydroxide and a basic magnesium carbonate.

6. The flame-retardant cross-linked composition of claim 5, wherein the metallic hydrate is surface treated with one of a fatty acid, phosphoric ester, silane coupling agent, and titanate coupling agent.

7. A flame-retardant cable comprising:
(a) a core including one subcore or more than one subcore twisted together, the subcore having a conductor coated with an electrical insulation, the insulation being made of a material free from any halogen; and
(b) a sheath provided over the core and made of a flame-retardant cross-linked composition produced by:
(c) mixing a first compound of a polyolefin resin and a metallic hydrate with a silane-grafted polyolefin resin to form a second compound, both the resins being free of any halogen;
(d) silane cross-linking the second compound to form the flame-retardant cross-linked composition; and
(e) wherein the metallic hydrate is mixed in an amount of about 50 to about 200 parts by weight per 100 parts by weight of both the polyolefin resin and the silane-grafted polyolefin resin, and the polyolefin resin is mixed in an amount of about $(100-x)$ parts by weight wherein x is the amount of the silane-grafted polyolefin resin and is $20 \leq x \leq 80$ parts by weight.

8. The flame-retardant cable of claim 7, wherein the first compound further includes about 5 to about 70 parts by weight of a carbon powder per 100 parts by weight of the polyolefin resin and the silane-grafted polyolefin resin together.

9. The flame-retardant cable of claim 8, wherein the first compound further contains a red phosphorus flame retardant including red phosphorus in an amount of about 2 to about 50 parts by weight per 100 parts by weight of the polyolefin resin and the silane-grafted polyolefin resin together.

10. The flame-retardant cable of claim 7, 8 or 9, further comprising a flame barrier layer interposed between the core and the sheath, the barrier layer being formed of a piece of nonflammable tape wound around the core in an overlapping manner.

11. The flame-retardant cable of claim 10, wherein the nonflammable tape is one selected from the group consisting of a metallic tape, an inorganic tape containing a ceramic in a larger proportion and a two-layer composite of the metallic tape and the inorganic tape.

12. The flame-retardant cable of claim 11, wherein the inorganic tape is one selected from the group consisting of a mica polyester laminated tape, mica glass tape, mica-paper composite tape, mica-paper laminated tape, asbestos tape, silicone-applied glass tape, alkyd varnish-applied glass tape, alumina melt-spinning tape, silica melt-spinning tape, composite tape of an alumina melt-spinning fiber and a glass fiber, two-layer composite tape of an silica melt-spinning fiber and a glass fiber, and alumina-glass laminated tape.

13. The flame-retardant cable of claim 10, further comprising a carbonizable tape layer interposed between the core and the flame barrier layer, the carbonizable tape layer formed by winding around the core a tape which is carbonizable when the cable is subjected to high temperatures.

14. The flame-retardant cable of claim 13, wherein the carbonizable tape is made of a substance selected from the group consisting of a kraft paper, acrylic fiber cloth, rayon cloth, natural cellulosic fiber, and those materials impregnated with a silicone varnish or an alkyd varnish.

15. The flame-retardant cable of claim 13, further comprising a barrier protection layer, interposed between the flame barrier layer and the sheath, for mechanically and thermally protecting the flame barrier layer, the barrier protection layer is formed by winding at least one piece of tape made of asbestos, glass or ceramic fiber.

16. The flame-retardant cable of claim 10, further comprising a barrier protection layer, interposed between the flame barrier layer and the sheath, for mechanically and thermally protecting the flame barrier layer, the barrier protection layer is formed by winding at least one piece of tape made of asbestos, glass or ceramic fiber.

17. The flame-retardant cross-linked composition of in claim 7, wherein the metallic hydrate is a substance selected from the group consisting of aluminum hydroxide, magnesium hydroxide, calcium hydroxide and a basic magnesium carbonate.

18. The flame-retardant cross-linked composition of claim 17, wherein the metallic hydrate is surface treated with a compound selected from the group consisting of a fatty acid, a phosphoric ester, a silane coupling agent and a titanate coupling agent.

* * * * *